(12) United States Patent
Shim

(10) Patent No.: US 11,531,373 B2
(45) Date of Patent: Dec. 20, 2022

(54) WINDOW PANEL, DISPLAY DEVICE INCLUDING THE SAME, AND MANUFACTURING METHOD THEREOF

(71) Applicant: Samsung Display Co., Ltd., Yongin-si (KR)

(72) Inventor: Byoung Yul Shim, Hwaseong-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 83 days.

(21) Appl. No.: 16/545,964

(22) Filed: Aug. 20, 2019

(65) Prior Publication Data
US 2020/0166965 A1 May 28, 2020

(30) Foreign Application Priority Data
Nov. 26, 2018 (KR) .................. 10-2018-0147319

(51) Int. Cl.
*G06F 1/16* (2006.01)
*G02F 1/1333* (2006.01)

(52) U.S. Cl.
CPC ...... *G06F 1/1637* (2013.01); *G02F 1/133308* (2013.01); *G02F 1/133325* (2021.01)

(58) Field of Classification Search
None
See application file for complete search history.

(56) References Cited

U.S. PATENT DOCUMENTS

| 2012/0098551 | A1* | 4/2012 | Tsukamoto | G06F 3/045 324/658 |
| 2012/0249453 | A1* | 10/2012 | Tsukamoto | G02F 1/13338 345/173 |
| 2015/0085204 | A1* | 3/2015 | Lee | G06F 3/041 349/12 |
| 2015/0116245 | A1* | 4/2015 | Tseng | G06F 3/041 345/173 |

(Continued)

FOREIGN PATENT DOCUMENTS

| KR | 100949684 | 3/2010 |
| KR | 1020120006175 | 1/2012 |

(Continued)

*Primary Examiner* — James Wu
*Assistant Examiner* — Christopher L Augustin
(74) *Attorney, Agent, or Firm* — Cantor Colburn LLP

(57) ABSTRACT

A window panel for a display device includes a window substrate which includes a transmissive area which transmits an image displayed on a display panel and a non-transmissive area disposed at a periphery of the transmissive area, a first print layer disposed on a first side of the window substrate in the non-transmissive area, and which forms a boundary line between the transmissive area and the non-transmissive area, and a second print layer disposed on the first print layer in the non-transmissive area. The non-transmissive area includes a first non-transmissive area adjacent to the transmissive area and a second non-transmissive area adjacent to an edge of the window substrate, and side surfaces of the first and second print layers form an inclined surface which has an inclination angle that is smaller than a right angle with respect to the first side of the window substrate in the first non-transmissive area.

4 Claims, 14 Drawing Sheets

(56) References Cited

U.S. PATENT DOCUMENTS

| | | | |
|---|---|---|---|
| 2015/0301637 A1* | 10/2015 | Chen | G06F 3/041 |
| | | | 345/173 |
| 2016/0066440 A1* | 3/2016 | Choi | G06F 1/1656 |
| | | | 361/679.3 |
| 2016/0276419 A1* | 9/2016 | Lim | H01L 51/5246 |
| 2017/0020014 A1* | 1/2017 | Lee | G06F 3/04164 |
| 2017/0202096 A1* | 7/2017 | Park | G06F 1/1637 |

FOREIGN PATENT DOCUMENTS

| KR | 101373142 | 3/2014 |
|---|---|---|
| KR | 1020140065155 | 5/2014 |
| KR | 1020140071093 | 6/2014 |

\* cited by examiner

US 11,531,373 B2

WINDOW PANEL, DISPLAY DEVICE INCLUDING THE SAME, AND MANUFACTURING METHOD THEREOF

CROSS-REFERENCE TO RELATED APPLICATION

This application claims priority to Korean Patent Application No. 10-2018-0147319, filed on Nov. 26, 2018, and all the benefits accruing therefrom under 35 U.S.C. § 119, the content of which in its entirety is herein incorporated by reference.

BACKGROUND

(a) Field

Exemplary embodiments of the invention relates to a window panel where a print layer is formed, a display device including the window panel, and a method for manufacturing the display device.

(b) Description of the Related Art

A display device includes a display panel that displays an image, and a window panel that is disposed on an upper portion of the display panel and protects the display panel. As a display panel, an organic light emitting diode ("OLED") display, a liquid crystal display ("LCD"), and the like have been widely used.

SUMMARY

A print layer may be formed in the window panel that protects the display panel to block light leakage that may occur at an edge of the display device or to decorate the display device. When the display panel and the window panel are bonded to each other, bubbles may remain between the display panel and the window panel due to a step difference of the print layer, formed in the window panel when the display panel and the window panel are bonded to each other. The bubbles may cause a contact failure between the display panel and the window panel or a touch failure of a touch sensor included in the display panel.

Exemplary embodiments of the invention have been made in an effort to provide a window panel in which a print layer is formed and which can prevent generation of bubbles during a bonding process of the window panel and a display panel including the window panel, and a method for manufacturing the display device.

A window panel for a display device according to an exemplary embodiment of the invention includes a window substrate which includes a transmissive area which transmits an image displayed on a display panel and a non-transmissive area disposed at a periphery of the transmissive area, a first print layer disposed on a first side of the window substrate in the non-transmissive area, and which defines a boundary line between the transmissive area and the non-transmissive area, and a second print layer disposed on the first print layer in the non-transmissive area. The non-transmissive area includes a first non-transmissive area adjacent to the transmissive area and a second non-transmissive area adjacent to an edge of the window substrate, and a side surface of the first print layer and a side surface of the second print layer form an inclined surface which has an inclination angle that is smaller than a right angle with respect to the first side of the window substrate in the first non-transmissive area.

In an exemplary embodiment, the side surface of the first print layer and the side surface of the second print layer may form one continuous inclined surface which is inclined toward the second non-transmissive area from the boundary line.

In an exemplary embodiment, the inclined surface may be a straight-line surface having a predetermined inclination angle with respect to the first side of the window substrate.

In an exemplary embodiment, the inclined surface may be a convex surface of which the inclination angle is gradually decreased along a direction toward the second non-transmissive area from the boundary line.

In an exemplary embodiment, the inclined surface may be a concave surface of which the inclination angle is gradually increased along a direction toward the second non-transmissive area from the boundary line.

In an exemplary embodiment, the window substrate may have a curved surface such that the first side of the window substrate is concave in the non-transmissive area.

In an exemplary embodiment, the inclined surface may be a straight-line surface having a predetermined inclination angle with respect to the first side of the window substrate at the boundary line.

In an exemplary embodiment, the inclined surface may be a convex surface of which the inclination angle is gradually decreased along a direction toward the second non-transmissive area from the boundary line.

In an exemplary embodiment, the inclined surface may be a concave surface of which the inclination angle is gradually increased along a direction toward the second non-transmissive area from the boundary line.

A display device according to another exemplary embodiment of the invention includes a display panel which includes a display area including a plurality of pixels and a non-display area disposed at a periphery of the display area, a window substrate which includes a transmissive area corresponding to the display area and a non-transmissive area corresponding to the non-display area, a first print layer disposed on a first side of the window substrate in the non-transmissive area, and defines a boundary line between the transmissive area and the non-transmissive area, and a second print layer disposed on the first print layer in the non-transmissive area The non-transmissive area includes a first non-transmissive area adjacent to the transmissive area and a second non-transmissive area adjacent to an edge of the window substrate, and a side surface of the first print layer and a side surface of the second print layer form an inclined surface having an inclination angle that is smaller than a right angle with respect to the first side of the first print layer in the first non-transmissive area.

In an exemplary embodiment, the side surface of the first print layer and the side surface of the second print layer may form one continuous inclined surface which is inclined toward the second non-transmissive area from the boundary line.

In an exemplary embodiment, the inclined surface may be a straight-line surface having a predetermined inclination angle with respect to the first side of the window substrate.

In an exemplary embodiment, the inclined surface may be a convex surface of which the inclination angle is gradually decreased along a direction toward the second non-transmissive area from the boundary line.

In an exemplary embodiment, the inclined surface may be a concave surface of which the inclination angle is gradually increased along a direction toward the second non-transmissive area.

In an exemplary embodiment, the window substrate may form a curved surface such that the first side of the window substrate is concave in the non-transmissive area.

In an exemplary embodiment, the inclined surface may be a straight-line surface having a predetermined inclination angle with respect to the first side of the window substrate at the boundary line.

In an exemplary embodiment, the inclined surface may be a convex surface of which the inclination angle is gradually decreased along a direction toward the second non-transmissive area.

In an exemplary embodiment, the inclined surface may be a concave surface of which the inclination angle is gradually increased along a direction toward the second non-transmissive area.

According to another exemplary embodiment, a method for manufacturing a display device is provided. The method includes forming a first print layer on a first side of a window substrate in a non-transmissive area, the first print layer defining a boundary line between a transmissive area which transmits an image displayed on a display panel and the non-transmissive area which surrounds the transmissive area, forming a second print layer which covers the first print layer from an edge of the window substrate to a portion distanced toward the edge of the window substrate by a margin distance from the boundary line, and pressing the first print layer and the second print layer by using a compression pad such that a side surface of the first print layer and a side surface of the second print layer are formed to an inclined surface having an inclination angle that is smaller than a right angle with respect to a first side of the window substrate.

In an exemplary embodiment, the side surface of the first print layer and the side surface of the second print layer may form one continuous inclined surface which is inclined toward the edge of the window substrate from the boundary line.

According to the exemplary embodiments of the invention, generation of bubbles during a bonding process of the window panel and the display panel can be prevented, thereby improving the production yield of the display device.

DETAILED DESCRIPTION

Figure 1:
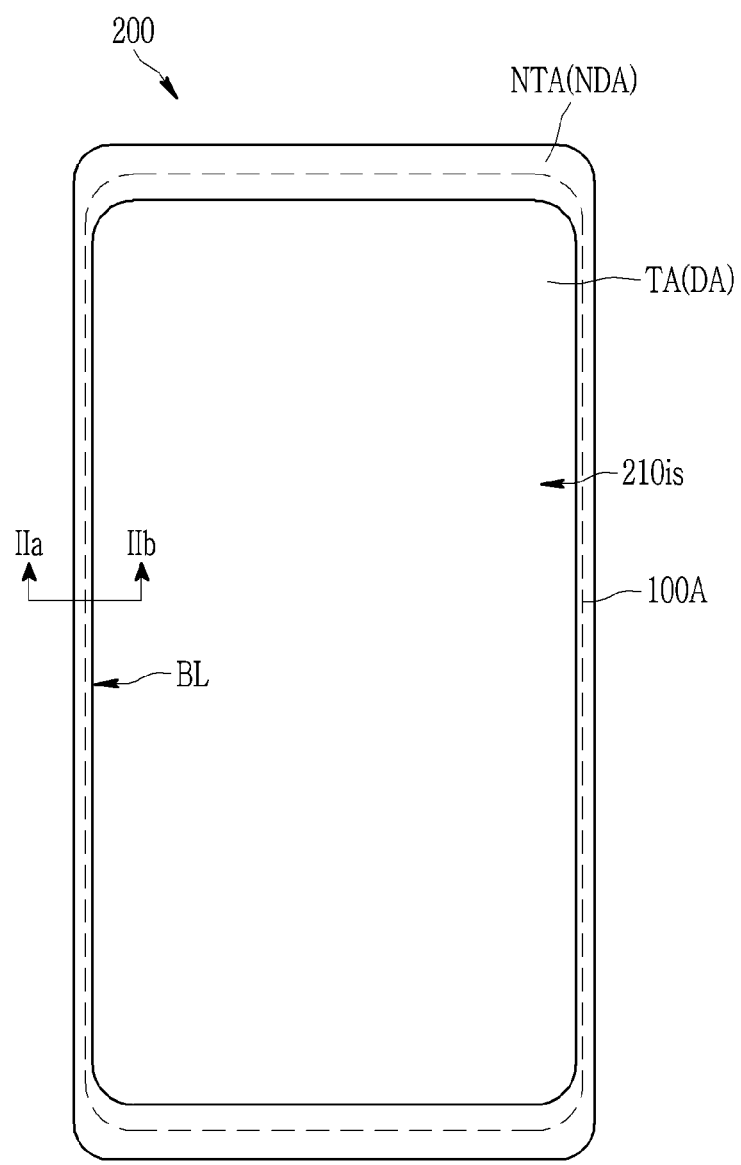
FIG. 1 is a top plan view of an exemplary embodiment of a window panel according to the invention.

Hereinafter, exemplary embodiments of the invention will be described more fully with reference to the accompanying drawings, in which exemplary embodiments of the invention are shown. As those skilled in the art would realize, the described exemplary embodiments may be modified in various different ways, all without departing from the spirit or scope of the present invention.

Further, in the exemplary embodiments, since like reference numerals designate like elements having the same configuration, a first exemplary embodiment is representatively described, and in other exemplary embodiments, only different configurations from the first exemplary embodiment will be described.

Accordingly, the drawings and description are to be regarded as illustrative in nature and not restrictive. Like reference numerals designate like elements throughout the specification.

Further, in the drawings, size and thickness of each element are arbitrarily represented for better understanding and ease of description, but the present invention is not limited thereto. In the drawings, the thickness of layers, films, panels, regions, etc., are exaggerated for clarity. In the drawings, the thicknesses of layers, regions, etc., are exaggerated for convenience in description and better understanding.

It will be understood that when an element such as a layer, film, region, or substrate is referred to as being "on" another element, it can be directly on the other element or intervening elements may also be present. In contrast, when an element is referred to as being "directly on" another element, there are no intervening elements present. The word "on" or "above" means positioned on or below the object portion, and does not necessarily mean positioned on the upper side of the object portion based on a gravitational direction.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items.

FIG. 1 is a top plan view of an exemplary embodiment of a window panel according to the invention.

Referring to FIG. 1, a display device includes a window panel 200 and a display panel (not shown) bonded with the window panel 200. The display panel may include a touch sensor.

The window panel 200 includes a transmissive area TA and a non-transmissive area NTA. The transmissive area TA is an area where an image displayed on the display panel is transmitted toward a user side. The non-transmissive area NTA is disposed at the periphery of the transmissive area TA. As shown in FIG. 1, the non-transmissive area NTA may be disposed to surround the edge of the transmissive area TA. A boundary between the transmissive area TA and the non-transmissive area NTA is defined as a boundary line BL.

FIG. 1 shows a rear side 210is of the window panel 200. The display panel is bonded to the rear side 210is of the window panel 200. An area of the rear side 210is of the window panel 200, to which the display panel is bonded, is referred to as a display panel area 100A. The display panel area 100A may overlap the entire transmissive area TA and a part of the non-transmissive area NTA in the top plan view. That is, the display panel may be bonded to the window panel 200 while overlapping the entire transmissive area TA and a part of the non-transmissive area NTA of the window panel 200. Depending on exemplary embodiments, the display panel may be bonded to the window panel 200 while overlapping the entire transmissive area TA and non-transmissive area NTA of the window panel 200 in the top plan view.

The display panel includes a display area DA and a non-display area NDA. The display area DA is an area where a plurality of pixels are included and thus through which an image is displayed. The non-display area NDA is an area disposed at the periphery of the display area DA, and a driving circuit and wires may be disposed therein to transmit signals to the plurality of pixels. The transmissive area TA may correspond to the display area DA of the display panel, and the non-transmissive area NTA may correspond to the non-display area NDA of the display panel. The display area DA may overlap the transmissive area TA while matching the transmissive area TA, and the non-display area NDA may overlap a part or the entire non-transmissive area NTA.

A print layer may be disposed in the non-transmissive area NTA to prevent the driving circuit and the wires disposed in the non-display area NDA from being exposed to a user. The print layer may prevent light leakage, which may occur at the edge of the display device. The print layer may include patterns for decoration of the edge of the display device.

Figure 2:
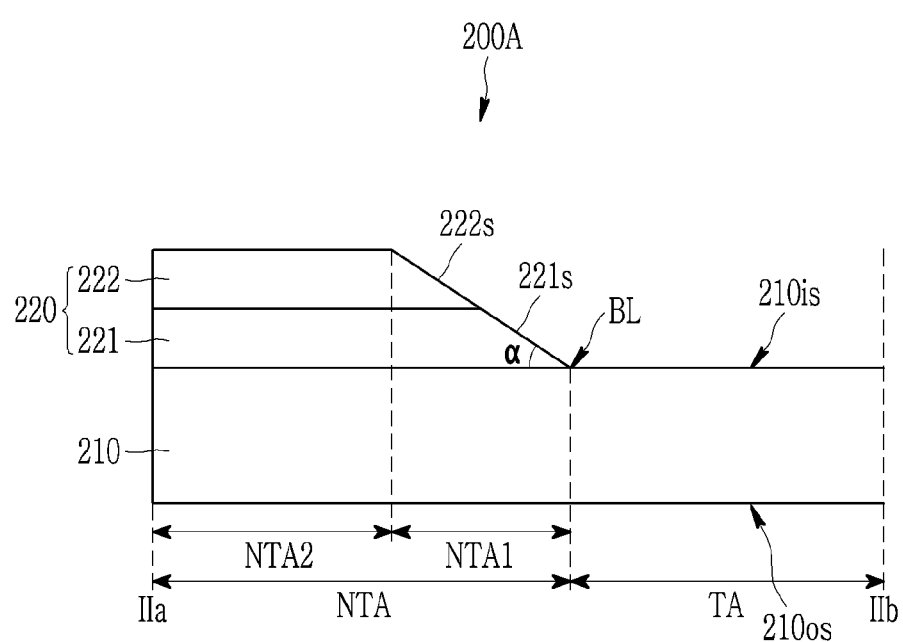
FIG. 2 is a cross-sectional view of an exemplary embodiment of FIG. 1, taken along line 11a-11b.
Figure 3:
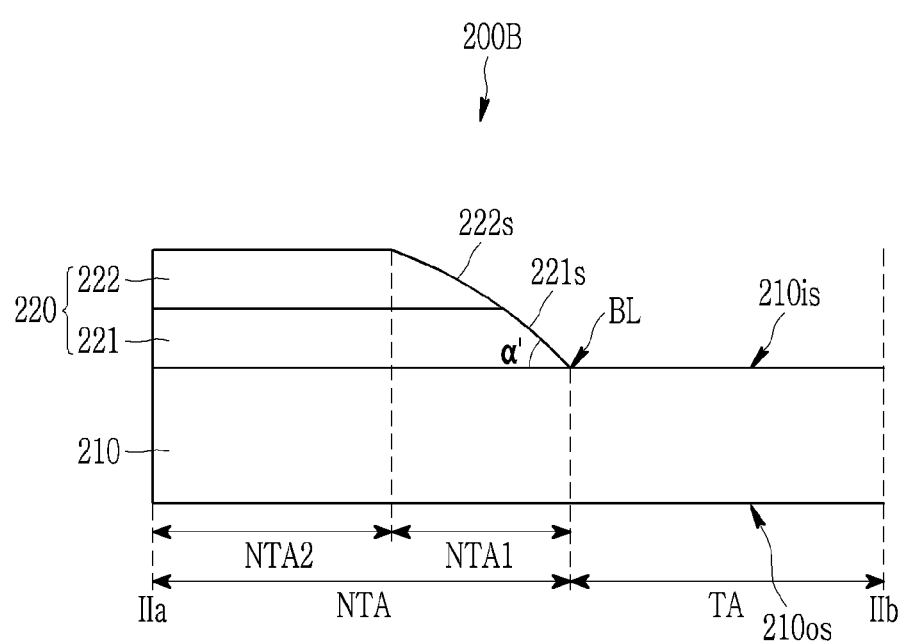
FIG. 3 is a cross-sectional view of another exemplary embodiment of FIG. 1, taken along line 11a-11b.
Figure 4:
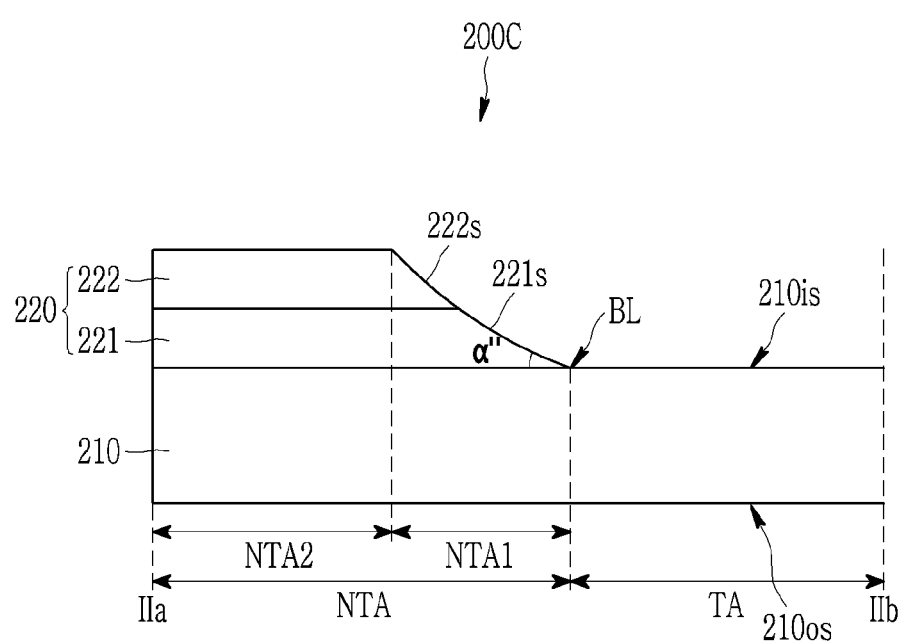
FIG. 4 is a cross-sectional view of still another exemplary embodiment of FIG. 1, taken along line 11a-11b.
Figure 5:
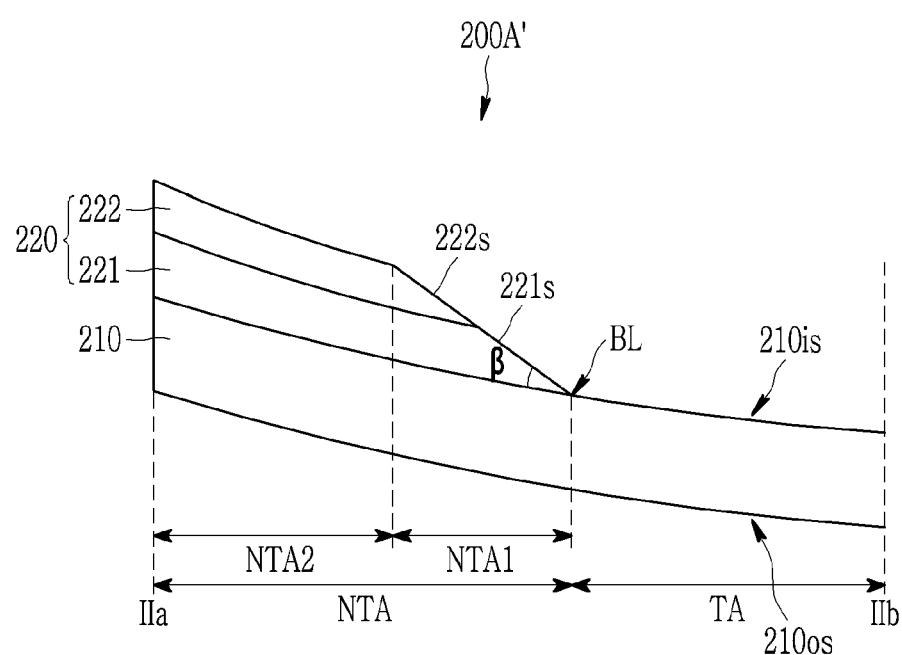
FIG. 5 is a cross-sectional view of still another exemplary embodiment of FIG. 1, taken along line 11a-11b.
Figure 6:
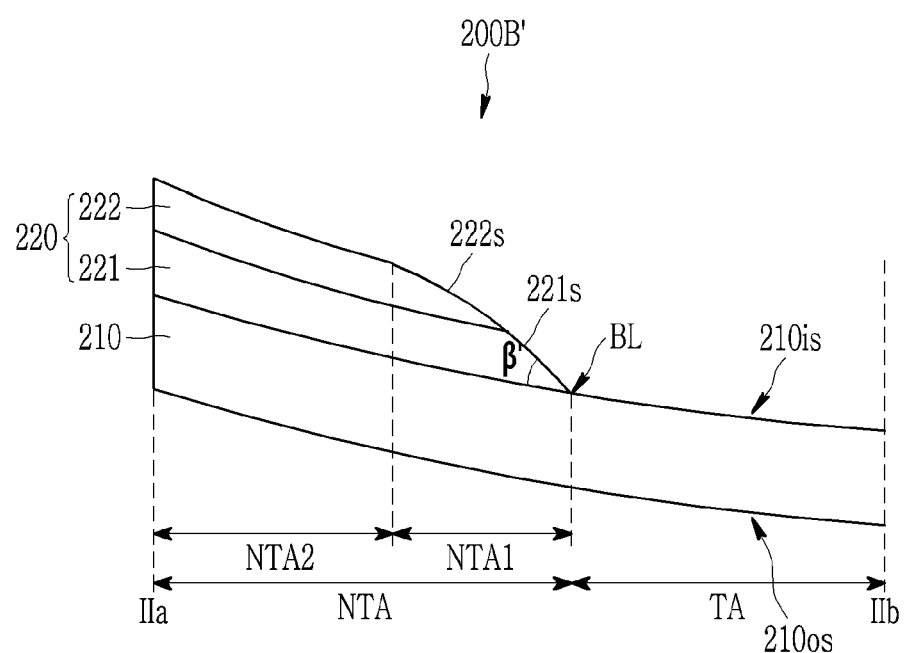
FIG. 6 is a cross-sectional view of still another exemplary embodiment of FIG. 1, taken along line 11a-11b.
Figure 7:
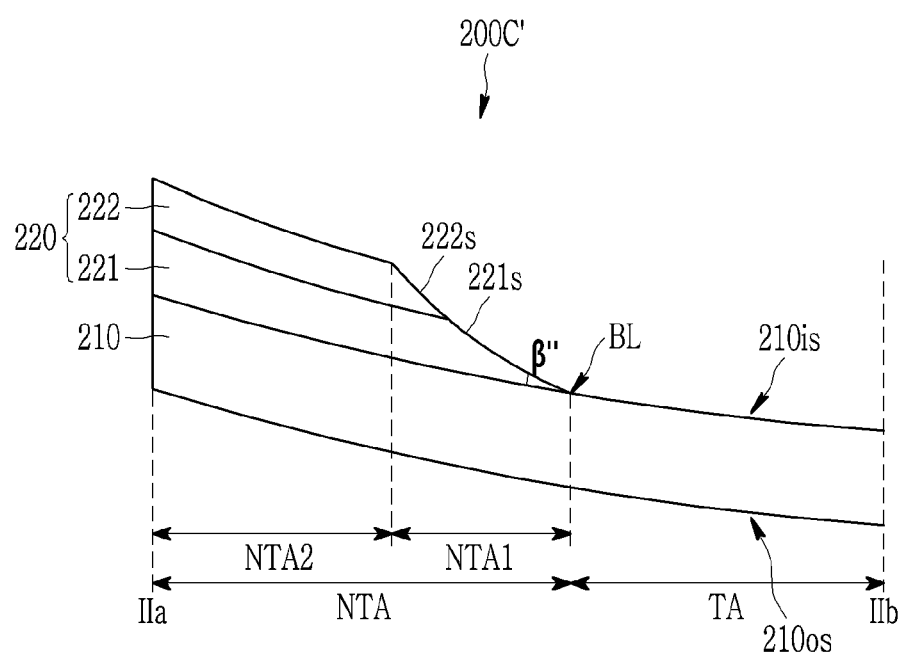
FIG. 7 is a cross-sectional view of still another exemplary embodiment of FIG. 1, taken along line 11a-11b.

The print layer is disposed between the window panel 200 and the display panel, and bubbles may be generated near the boundary line BL due to a step difference of the print layer. Hereinafter, exemplary embodiments that can prevent generation of bubbles near the boundary line BL will be described with reference to FIG. 2 to FIG. 7. FIG. 2 to FIG. 4 are provided for description of exemplary embodiments in which the window substrate 210 is flat, and FIG. 5 to FIG. 7 are provided for description of exemplary embodiments in which edge portions of the window substrate 210 are curved.

FIG. 2 is a cross-sectional view of an exemplary embodiment of FIG. 1, taken along line 11a-11b.

Referring to FIG. 2, a window panel 200A according to an exemplary embodiment includes a window substrate 210 and a print layer 220. The print layer 220 may include a first print layer 221 and a second print layer 222.

The window substrate 210 may include transparent glass or plastic. The window substrate 210 includes a transmissive area TA and a non-transmissive area NTA, and may be flat in the transmissive area TA and the non-transmissive area NTA. Depending on exemplary embodiments, a part of the transmissive area TA and the non-transmissive area NTA may have curved surfaces, and this will be described later with reference to FIG. 5 to FIG. 7.

The first print layer 221 and the second print layer 222 may be disposed on the rear side 210is of the window substrate 210 in the non-transmissive area NTA. A front side 210os, which is the opposite side of the rear side 210is of the window substrate 210, is a side that faces a user. The front side 210os of the window substrate 210 may be referred to as an outer side, and the rear side 210is of the window substrate 210 may be referred to as an inner side.

The non-transmissive area NTA includes a first non-transmissive area NTA1 that is adjacent to the transmissive area TA, and a second non-transmissive area NTA2 that is adjacent to the edge of the window substrate 210. The first transmissive area NTA1 is disposed between the transmissive area TA and the second non-transmissive area NTA2.

The first print layer 221 is disposed on the rear side 210is of the window substrate 210 in the non-transmissive area NTA. The first print layer 221 may be disposed from the edge of the window substrate 210 to a boundary line BL. The first print layer 221 may form the boundary line BL such that the transmissive area TA can conform to a standard. That is, an edge of the first print layer 221 toward the transmissive area TA defines the boundary line BL such that the transmissive area TA may have a standard size outlined by the boundary line BL. The first print layer 221 may overlap the entire non-transmissive area NTA in the top plan view. The first print layer 221 may include a dye material of a black color. A thickness of the first print layer 221 may be about 5 micrometers (μm) or about 10 μm depending on a printing method.

The second print layer 222 is disposed on the first print layer 221 in the non-transmissive area NTA. The second print layer 222 may be disposed from the edge of the window substrate 210 to a portion that is separated by a predetermined distance from the boundary line BL. The second print layer 222 may overlap the entire second non-transmissive area NTA2 and a part of the first non-transmissive area NTA1. The second print layer 222 may serve to reinforce the first print layer 221. The second print layer 222 may include a dye material of a black color. The second print layer 222 may have a thickness of about 5 μm or about 10 μm depending on a printing method.

In the second non-transmissive area NTA2, the first print layer 221 and the second print layer 222 may be disposed to be parallel with the rear side 210is (i.e., rear side surface) of the window substrate 210.

In the first non-transmissive area NTA1, a side surface 221s of the first print layer 221 and a side surface 222s of the second print layer 222 may respectively form an inclined surface. The inclined surface forms an angle α that is smaller than a right angle with respect to the rear side 210*is* of the window substrate 210. That is, the inclination angle α is an acute angle. The side surface 221*s* of the first print layer 221 and the side surface 222*s* of the second print layer 222 may form one continuous inclined surface that is inclined in a direction of the second non-transmissive area NTA2 from the boundary line BL. As exemplarily shown in FIG. 2, the inclined surface may be a straight-line surface having a predetermined inclination angle α with respect to the rear side 210*is* of the window substrate 210 in the first non-transmissive area NTA1.

That is, a bottom side of the first print layer 221, contacting the window substrate 210, may be formed from the edge of the window substrate 210 to the boundary line BL by the rear side 210*is*, and a top surface of the first print layer 221 may be formed to near the middle of the first non-transmissive area NTA1 from the edge of the window substrate 210 and be parallel with the rear side 210*is*. In addition, a bottom side of the second print layer 222, contacting the top surface of the first print layer 221, may be formed from the edge of the window substrate 210 to near the middle of the first non-transmissive area NTA1, and a top surface of the second print layer 222 may be formed from the edge of the window substrate 210 to a border between the first non-transmissive area NTA1 and the second non-transmissive area NTA2. The top surface of the first print layer 221 and the bottom side of the second print layer 222 may cover the same area so as be the same in size.

As described, since the side surface 221*s* of the first print layer 221 and the side surface 222*s* of the second print layer 222 are the inclined surface, generation of bubbles, which may be formed at the periphery of the boundary line BL if the first print layer 221 and the second print layer 222 have a step difference, can be prevented. This will be described in detail later with reference to FIG. 12 and FIG. 13.

Hereinabove, the print layer 220 including the first print layer 221 and the second print layer 222 are explained as an example, but depending on exemplary embodiments, the print layer 220 may include three or more print layers. In addition, at least one of the plurality of print layers may include a dye material that is different from the black color. In another exemplary embodiment, the print layer 220 may be provided as a single layer.

FIG. 3 is a cross-sectional view of another exemplary embodiment of FIG. 1, taken along line 11*a*-11*b*. Only differences compared to the exemplary embodiment of FIG. 2 will be mainly described.

Referring to FIG. 3, a window panel 200B according to another exemplary embodiment includes a first print layer 221 and a second print layer 222, and an inclined surface including a side surface 221*s* of the first print layer 221 and a side surface 222*s* of the second print layer 222 may be convex toward a transmissive area TA. That is, as shown in FIG. 3 as an example, the inclined surface may be a convex surface of which an inclination angle α' with respect to the rear side 210*is* (i.e., rear side surface) is gradually decreased along a direction toward a second non-transmissive area NTA2 from a boundary line BL.

Except for such a difference, features of the above-described exemplary embodiment described with reference to FIG. 2 can be applied to the exemplary embodiment described with reference to FIG. 3, and therefore the explanation of the features of the exemplary embodiment described with reference to FIG. 2 will be omitted.

FIG. 4 is a cross-sectional view of still another exemplary embodiment of FIG. 1, taken along line 11*a*-11*b*. Only a difference compared to the exemplary embodiment of FIG. 2 will be mainly described.

Referring to FIG. 4, a window panel 200C according to still another exemplary embodiment includes a first print layer 221 and a second print layer 222, and an inclined surface including a side surface 221*s* of the first print layer 221 and a side surface 222*s* of the second print layer 222 may be concave toward an edge of a window substrate 210. That is, as shown in FIG. 4 as an example, the inclined surface may be a concave surface of which an inclination angle α" with respect to the rear side 210*is* (i.e., rear side surface) is gradually increased along a direction toward a second non-transmissive area NTA2 from a boundary line BL.

Except for such a difference, features of the above-described exemplary embodiment described with reference to FIG. 2 can be applied to the exemplary embodiment described with reference to FIG. 4, and therefore other explanations regarding the features of the exemplary embodiment described with reference to FIG. 2 will be omitted.

FIG. 5 is a cross-sectional view of still another exemplary embodiment of FIG. 1, taken along line 11*a*-11*b*. Only a difference compared to the exemplary embodiment of FIG. 2 will be mainly described.

Referring to FIG. 5, a window panel 200A' according to still another exemplary embodiment includes a window substrate 210 and a print layer 220, and a part of the window substrate 210 may have a curved surface. That is, the window substrate 210 may be partially curved. As shown in FIG. 5 as an example, the window substrate 210 may have a curved surface in a non-transmissive area NTA and a part of a transmissive area TA, which is adjacent to the non-transmissive area NTA, such that a rear side 210*is* is concave or a front side 210*os* is convex in the transmissive area TA. Although it is not illustrated in FIG. 5, the transmissive area TA of the window substrate 210 may be flat, excluding the part of a transmissive area TA adjacent to the non-transmissive area NTA.

A first print layer 221 and a second print layer 222 may be curved conforming to the curved surface of the window substrate 210 in the non-transmissive area NTA. An inclined surface including a side surface 221*s* of the first print layer 221 and a side surface 222*s* of a second print layer 222 may have an inclination angle β that is smaller than a right angle at a boundary area BL with respect to the rear side 210*is* of the window substrate 210. The inclined surface may be a straight-line surface having a predetermined inclination angle β with respect to the rear side 210*is* of the window substrate 210 from the boundary line BL to the second non-transmissive area NTA1 within a first non-transmissive area NTA1.

Except for such a difference, features of the above-described exemplary embodiment described with reference to FIG. 2 can be applied to the exemplary embodiment described with reference to FIG. 5, and therefore other explanations of the features of the exemplary embodiment described with reference to FIG. 2 will be omitted.

FIG. 6 is a cross-sectional view of still another exemplary embodiment of FIG. 1, taken along line 11*a*-11*b*. Only a difference compared to the exemplary embodiment of FIG. 3 will be mainly described.

Referring to FIG. 6, a window panel 200B' according to still another exemplary embodiment includes a window substrate 210 and a print layer 220, and a part of the window substrate 210 may have a curved surface. That is, the window substrate 210 may be partially bent. As shown in FIG. 6 as an example, the window substrate 210 may have a curved surface and thus a rear side 210is is concave or a front side 210os is convex in a non-transmissive area NTA and a part of a transmissive area TA, adjacent to the non-transmissive area NTA. Although it is not illustrated in FIG. 6, the transmissive area TA of the window substrate 210 may be flat, excluding the part adjacent to the non-transmissive area NTA.

A first print layer 221 and a second print layer 222 may be curved corresponding to the curved surface of the window substrate 210 in the non-transmissive area NTA. An inclined surface including a side surface 221s of the first print layer 221 and a side surface 222s of the second print layer 222 may have an inclination angle β' that is smaller than a right angle with respect to the rear side 210is of the window substrate 210 at a boundary line BL. The inclined surface may be a convex surface of which the inclination angle β' is gradually decreased along a direction toward a second non-transmissive area NTA from the boundary line BL in a first non-transmissive area NTA1.

Except for such a difference, features of the above-described exemplary embodiment described with reference to FIG. 3 can be applied to the exemplary embodiment described with reference to FIG. 6, and therefore other explanations regarding the features of the exemplary embodiment described with reference to FIG. 3 will be omitted.

FIG. 7 is a cross-sectional view of still another exemplary embodiment of FIG. 1, taken along line 11a-11b. Only a difference compared to the exemplary embodiment of FIG. 4 will be mainly described.

Referring to FIG. 7, a window panel 200C' according to still another exemplary embodiment includes a window substrate 210 and a print layer 220, and a part of the window substrate 210 may have a curved surface. That is, the window substrate 210 may be partially curved. As shown in FIG. 7 as an example, the window substrate 210 may have a curved surface in a non-transmissive area NTA and a part of a transmissive area TA, which is adjacent to the non-transmissive area NTA, such that a rear side 210is is concave or a front side 210os is convex in the non-transmissive area NTA and the part of a transmissive area TA which is adjacent to the non-transmissive area NTA. Although it is not illustrated in FIG. 7, the transmissive area TA of the window substrate 210 may be flat, excluding the part adjacent to the non-transmissive area NTA.

A first print layer 221 and a second print layer 222 may be curved conforming to the curved surface of the window substrate 210 in the non-transmissive area NTA. An inclined surface including a side surface 221s of the first print layer 221 and a side surface 222s of a second print layer 222 may have an inclination angle β" that is smaller than a right angle at a boundary area BL with respect to the rear side 210is of the window substrate 210. The inclined surface may be a concave surface of which the inclination angle β' is gradually increased along a direction toward a second non-transmissive area NTA from the boundary line BL in a first non-transmissive area NTA1.

Except for such a difference, features of the above-described exemplary embodiment described with reference to FIG. 4 can be applied to the exemplary embodiment described with reference to FIG. 7, and therefore other explanations of the features of the exemplary embodiment described with reference to FIG. 4 will be omitted.

A first edge (a cross-section taken along line 11a-11b) of the window panel 200 described with reference to FIG. 1 may have a shape according to one of the exemplary embodiments of FIG. 2 to FIG. 7. In this case, a second edge that is opposite to the first edge may have the same shape as the first edge or may have a shape according to another one of the exemplary embodiments of FIG. 2 to FIG. 7. In addition, at least one of third and fourth edges of the window panel 200 may have the same shape as the first edge or may have a shape according to another one of the exemplary embodiments of FIG. 2 to FIG. 7.

Hereinafter, a method for manufacturing a display device will be described with reference to FIG. 8 to FIG. 12.

Figure 8:
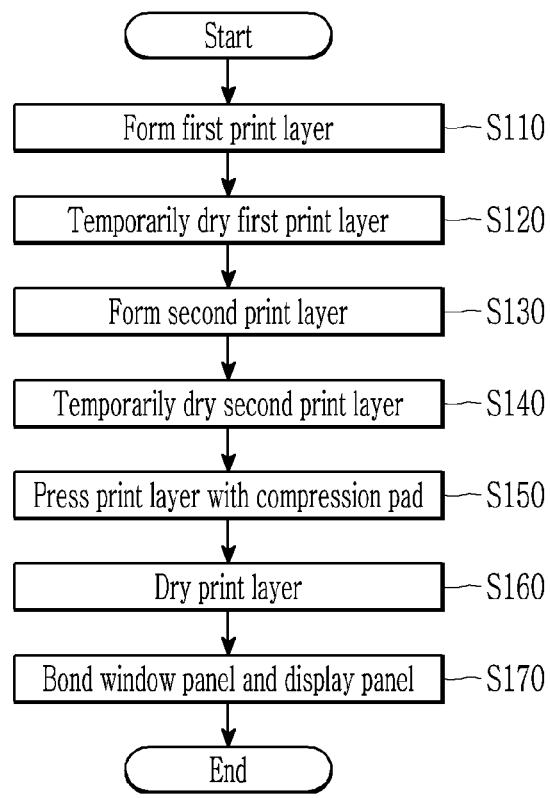
FIG. 8 is a flowchart of an exemplary embodiment of a manufacturing method of a display device according to the invention.
Figure 9:
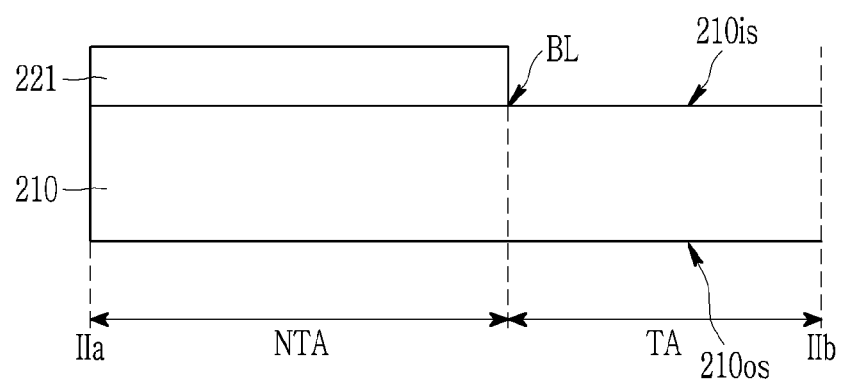
FIG. 9 to FIG. 11 are cross-sectional views of the manufacturing method of the display device of FIG. 8.
Figure 10:
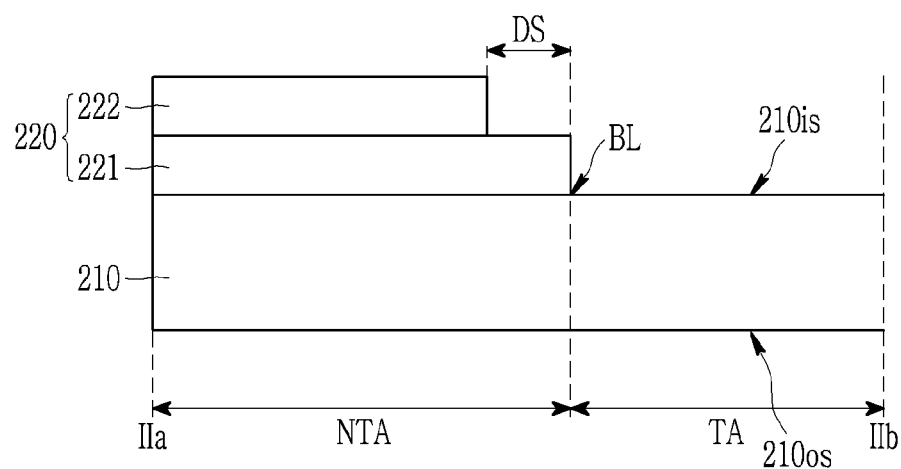
Figure 11:
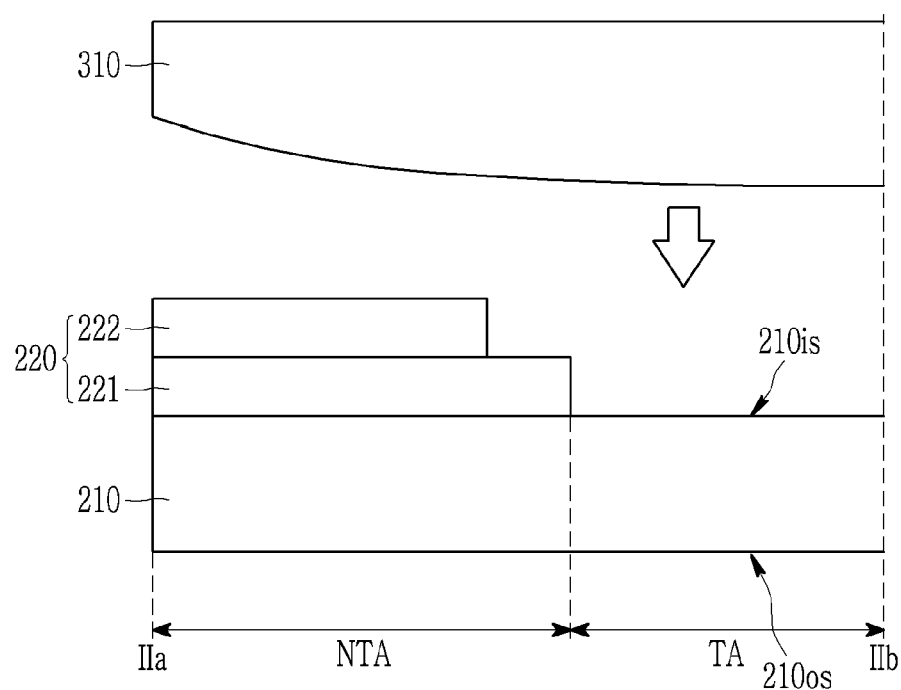
Figure 12:
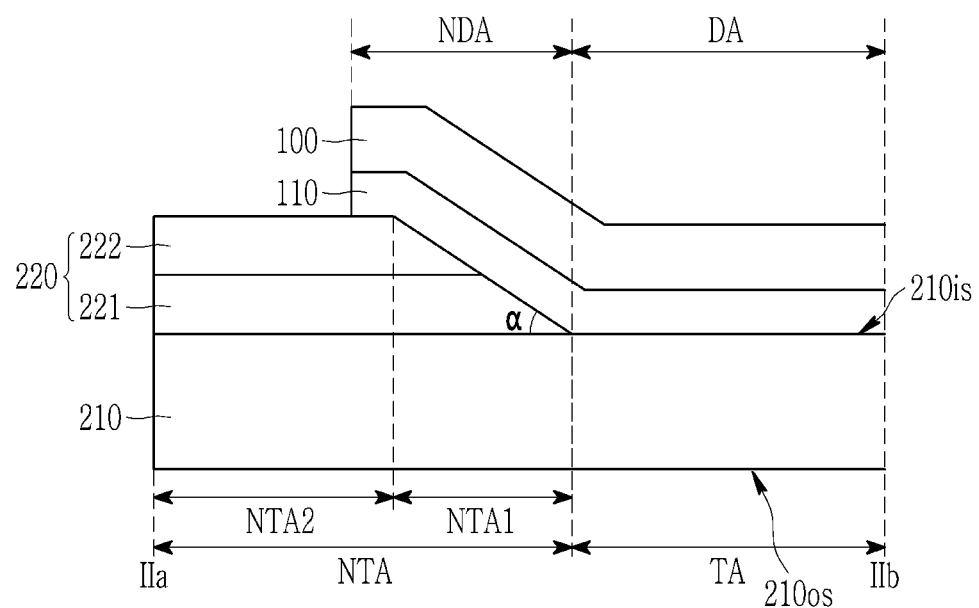
FIG. 12 is a cross-sectional view of a display device in a state that a window panel and a display panel are bonded to each other according to an exemplary embodiment of the invention.

FIG. 8 is a flowchart of an exemplary embodiment of a manufacturing method of a display device according to the invention. FIG. 9 to FIG. 11 are cross-sectional views provided for description of the manufacturing method of the display device of FIG. 8. FIG. 12 is a cross-sectional view of a display device in a state that a window panel and a display panel are bonded to each other according to an exemplary embodiment of the invention. A cross-sectional view of FIG. 1, taken along line 11a-11b, will be illustratively described. Referring to FIG. 8 to FIG. 12, a first print layer 221 is formed on a window substrate 210 that includes a transmissive area TA and a non-transmissive area NTA (S110, refer to FIG. 9). The first print layer 221 is formed in the non-transmissive area NTA, and a boundary line BL may be formed by the first print layer 221 to allow the transmissive area TA to conform to the standard size. The first print layer 221 may include a dye material of a black color. A thickness of the first print layer 221 may be about 5 μm or about 10 μm depending on a printing method.

For example, the first print layer 221 may be formed by using a pad printing method. The pad printing method is a method in which a concave pattern is formed on a substrate, a printing material such as ink and the like is filled in the concave pattern, the printing material is transferred to an elastic pad such as silicon or rubber, and then the printing material is transferred to the window substrate 210. In the case that the pad printing method is used, the first print layer 221 may be formed with a thickness of about 3 μm to about 7 μm.

In FIG. 8 to FIG. 12, forming the print layer 220 by using the pad printing method will be exemplarily described.

The first print layer 221 is formed in the non-transmissive area NTA, and then the first print layer 221 is temporarily dried at a temperature of about 60° C. to about 80° C. (S120).

After temporarily drying the first print layer 221, the second print layer 222 is formed on the first print layer 221 (S130, refer to FIG. 10). The second print layer 222 is not formed to the boundary line BL from the edge of the window substrate 210 but to a location toward the edge of the window substrate 210 by a distance separated by a margin distance DS from the boundary line BL. The margin distance DS may be about 0.1 μm to 0.2 μm, and is provided to prevent a process error which causes the second print layer 222 to be formed up to the transmissive area TA beyond the boundary line BL if the second print layer 222 is formed on the first print layer 221. That is, the second print layer 222 covers the first print layer 221 from the edge of the window substrate 210 to a portion distanced by the margin distance DS from the boundary line BL. The second print layer 222 may include a dye material of a black color. The second print layer 222 may be formed by using the pad printing method, and may have a thickness of about 3 μm to 7 μm according to the pad printing method.

After the second print layer 222 is formed on the first print layer 221, the second print layer 222 is temporarily dried at a temperature of about 60° C. to 80° C. (S140).

As shown in FIG. 10 as an example, the print layer 220 has a step difference due to the thickness of the first print layer 221 and the thickness of the second print layer 222. In addition, due to the margin distance DS, the end of the first print layer 221 and the end of the second print layer 222 opposite to the edge of the window substrate 210 do not match each other. Such a step difference of the print layer 220 may cause generation of bubbles at the periphery of the boundary line BL. In addition, the margin distance DS causes the end of the first print layer 221 and the end of the second print layer 222 near the boundary line BL to not be matched with each other, so bubbles may be formed near the boundary line BL. Such a bubble problem will be described later in a comparative example of FIG. 13.

In the present exemplary embodiment, the print layer 220 is pressed by a compression pad 310 to remove the gap between the end of the first print layer 221 and the end of the second print layer 222 due to the step difference and the margin distance DS of the print layer (S150, refer to FIG. 11). The compression pad 310 may include an elastic material such as silicon or rubber. The compression pad 310 may first contact the transmissive area TA at a center portion of the window substrate 210 and then contact the remaining portions of the window substrate 210 in such a manner that the contact surface gradually expands toward the non-transmissive area NTA. Since the temporarily-dried first print layer 221 and second print layer 222 are not completely dried, the ends of the first and second print layers 221 and 222 near the boundary line BL may be pressed and thus deformed due to pressure applied by the compression pad 310. In exemplary embodiments, when the compression pad 310 presses the print layer 220, heat is supplied to the print layer 220 from the front side 210os of the window substrate 210 to facilitate deformation of the print layer 220.

For example, the end of the first print layer 221 and the end of the second print layer 222 may be deformed to a shape of any one of the exemplary embodiments of FIG. 2 to FIG. 4 due to the compression by the compression pad 310, and a side surface 221s of the first print layer 221 and a side surface 222s of the second print layer 222 may form one inclined surface together. Similarly, in the case that an edge portion of the window substrate 210 is curved, the end of the first print layer 221 and the end of the second print layer 222 near the boundary line BL may be deformed to a shape of any one of the exemplary embodiments of FIG. 5 to FIG. 7 due to the compression by the compression pad 310, and a side surface 221s of the first print layer 221 and a side surface 222s of the second print layer 222 may form one inclined surface together.

After the print layer 220 is pressed by the compression pad 310, the print layer 220 may be dried at a temperature of about 150° C. to 180° C. (S160).

Next, the window panel and a display panel 100 are bonded to each other (S170, refer to FIG. 12). In FIG. 12, a case that the side surface 221s of the first print layer 221 and the side surface 222s of the second print layer 222 form a straight-line surface will be described. An optical-clear adhesive 110 may be provided on the rear side 210is of the window panel and the print layer 220 in the transmissive area TA and the non-transmissive area NTA so as to bond the window panel and the display panel 100 to each other. In addition, the display panel 100 is placed on the optical-clear adhesive 110 to bond the display panel 100 with the window panel. Since the side surface 221s of the first print layer 221 and the side surface 222s of the second print layer 222 form an inclined surface, the optical-clear adhesive 110 is formed throughout the side surface 221s of the first print layer 221 and the side surface 222s of the second print layer 222, and thus the display panel 100 can be compactly bonded with the window panel. Accordingly, generation of bubbles due to the step difference or the margin distance DS of the print layer 220 can be prevented. In addition, since the side surface 221s of the first print layer 221 and the side surface 222s of the second print layer 222 form an inclined surface, it is not necessary to thickly form the optical-clear adhesive 110.

Hereinafter, a bubble problem that can occur when the window panel and the display panel 100 are bonded to each other without carrying out the pressing of the print layer 220 with the compression pad 310 (S150) will be described with reference to FIG. 13.

Figure 13:
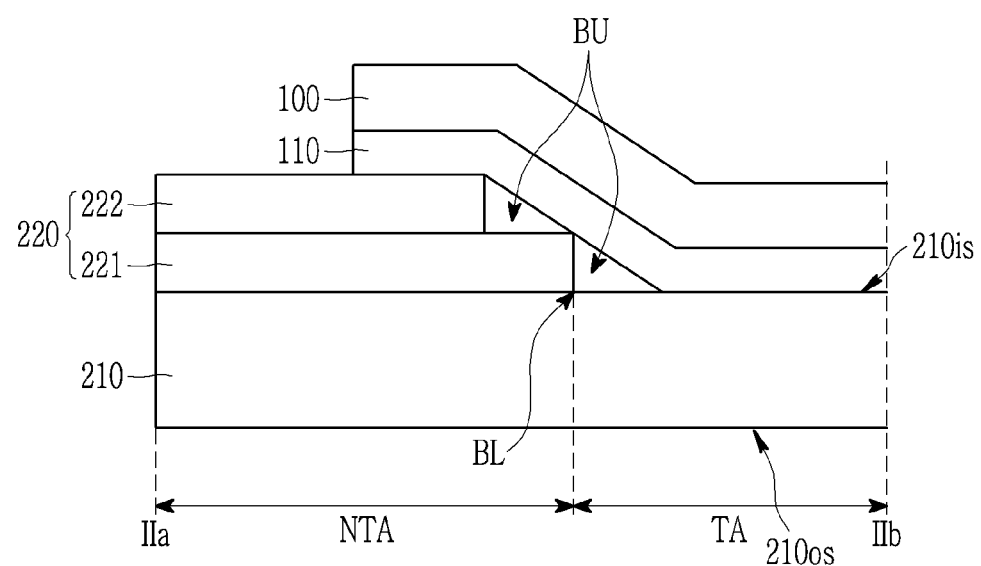
FIG. 13 is a cross-sectional view of a display device in which a window panel and a display panel are bonded to each other according to a comparative example.

FIG. 13 is a cross-sectional view of a display device in which a window panel and a display panel are bonded to each other according to a comparative example.

Referring to FIG. 13, when the pressing (S150) of the print layer 220 with the compression pad 310 is not carried out, a step difference of the print layer 220 still exists. In addition, the distance between the end of the first print layer 221 and the end of the second print layer 222 due to the margin distance DS still exists. In such a state, when the optical-clear adhesive 110 is disposed on the window panel and the display panel 100 is bonded to the window panel, bubbles BU may be formed near the boundary line BL. Such generation of the bubbles BU may cause a bonding failure between the display panel 100 and the window panel or a touch failure of a touch sensor included in the display panel 100.

However, the display device according to the exemplary embodiment of the invention can prevent such a failure due to generation of bubbles efficiently.

Hereinafter, a method for manufacturing a display device of which a print layer is formed by using a spray printing method will be described with reference to FIG. 14. Only a difference compared to the exemplary embodiments of FIG. 8 to FIG. 12 will be mainly described.

Figure 14:
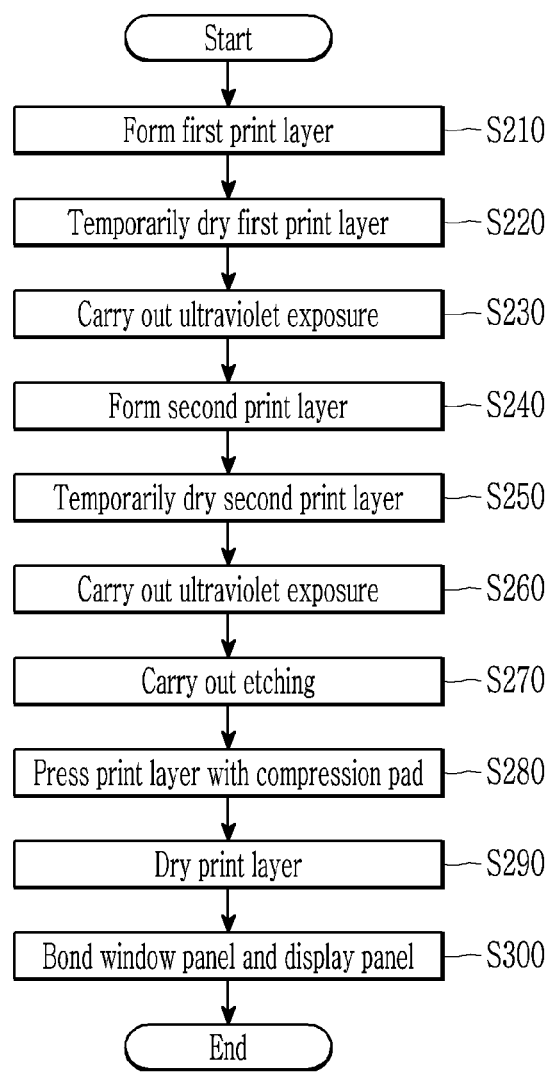
FIG. 14 is a flowchart of another exemplary embodiment of a method for manufacturing a display device according to the invention.

FIG. 14 is a flowchart of another exemplary embodiment of a method for manufacturing a display device according to the invention.

Referring to FIG. 14, a first print layer 221 is formed on a window substrate 210 that includes a transmissive area TA and a non-transmissive area NTA (S210). A printing material is sprayed on the window substrate 210 by using a sprayer such that the first print layer 221 may be formed. In this case, the first print layer 221 may be formed throughout a rear side 210is of the window substrate 210.

The first print layer 221 is temporarily dried at a temperature of about 60° C. to about 80° C. (S220).

Ultraviolet ("UV") exposure is carried out on the first print layer 221 by using a mask that specifies the non-transmissive area NTA (S230). A part of the first print layer 221, disposed in the non-transmissive area NTA, may be cured due to the ultraviolet exposure.

A second print layer 222 is formed on the first print layer 221 (S240). A printing material is sprayed on the window substrate 210 by using a sprayer such that the second print layer 222 may be formed. In this case, the second print layer 222 may be formed on the first print layer 221 and the transmissive area TA of the window substrate 210.

The second print layer 222 is temporarily dried at a temperature of about 60° C. to about 80° C. (S250).

A ultraviolet exposure is carried out on the second print layer 222 by using a mask that restricts the second print layer 222 to be formed from the edge of the window substrate 210 up to a portion separated by a margin distance DS from a boundary line BL toward the edge of the window substrate 210 (S260). The second print layer 222 may be partially cured, excluding the portion in the margin distance DS, by the ultraviolet exposure in the non-transmissive area NTA.

Etching is carried out on the first print layer 221 and the second print layer 222 (S270). Due to the etching, portions of the first and second print layers 221 and 222, which are not cured, are removed. Accordingly, the first print layer 221 and the second print layer 222 may be formed in the shape which is illustratively shown in FIG. 10.

The print layer 220 is pressed by using a compression pad 310 (S280). Due to a pressure applied by the compression pad 310, an end of the first print layer 221 and an end of the second print layer 222 near the boundary line BL may be pressed and thus deformed. In exemplary embodiments, when the compression pad 310 presses the print layer 220, the print layer 220 is heated from the front side 210os of the window substrate 210 to facilitate deformation of the print layer 220. The end of the first print layer 221 and the end of the second print layer 222 may be deformed to a shape of any one of the exemplary embodiments of FIG. 2 to FIG. 4 due to compression by the compression pad 310, and a side surface 221s of the first print layer 221 and a side surface 222s of the second print layer 222 may be formed as one inclined surface in the deformed ends of the first print layer 221 and the second print layer 222. Similarly, when an edge portion of the window substrate 210 is curved, the end of the first print layer 221 and the end of the second print layer 222 may be deformed to a shape of any one of the exemplary embodiments of FIG. 5 to FIG. 7 due to compression by the compression pad 310, and a side surface 221s of the first print layer 221 and a side surface 222s of the second print layer 222 may form one inclined surface together.

After the print layer 220 is pressed by the compression pad 310, the print layer 220 may be dried at a temperature of about 150° C. to 180° C. (S290).

Next, the window panel and the display panel 100 are bonded to each other (S300).

While this invention has been described in connection with what is presently considered to be practical exemplary embodiments, it is to be understood that the invention is not limited to the disclosed exemplary embodiments. On the contrary, it is intended to cover various modifications and equivalent arrangements included within the spirit and scope of the appended claims. It will be understood by those skilled in the art that various changes in form and detail may be made without departing from the scope of the invention. Accordingly, the true scope of the invention should be determined by the technical idea of the appended claims.

What is claimed is:

1. A display device comprising:
   a display panel that includes a display area including a plurality of pixels and a non-display area disposed at a periphery of the display area; and
   a window panel disposed on the display panel,
   wherein the window panel includes:
      a window substrate which includes a transmissive area corresponding to the display area and a non-transmissive area corresponding to the non-display area;
      a first print layer disposed on a first side of the window substrate in the non-transmissive area, and defines a boundary line between the transmissive area and the non-transmissive area; and
      a second print layer disposed on the first print layer in the non-transmissive area, and which includes a dye material of a non-black color,
   wherein the non-transmissive area comprises a first non-transmissive area adjacent to the transmissive area and a second non-transmissive area adjacent to an edge of the window substrate, and
   a side surface of the first print layer and a side surface of the second print layer form an inclined surface having an inclination angle that is smaller than a right angle with respect to the first side of the first print layer in the first non-transmissive area,
   wherein the window substrate has a curved surface such that the first side of the window substrate is concave in the non-transmissive area, and the second print layer has a curved surface which contacts the first print layer,
   wherein the display device further comprises:
      an optical-clear adhesive disposed between the display panel and the side surface of the first print layer and between the display panel and the side surface of the second print layer,
   wherein a surface of the window panel facing the optical-clear adhesive has a shape in a sequence of a curve, a straight-line, and a curve, from the second non-transmissive area to the transmissive area.

2. The display device of claim 1, wherein the side surface of the first print layer and the side surface of the second print layer form one continuous inclined surface which is inclined toward the second non-transmissive area from the boundary line.

3. The display device of claim 1, wherein the inclined surface is a straight-line surface having a predetermined inclination angle with respect to the first side of the window substrate.

4. The display device of claim 1, wherein the inclined surface is a straight-line surface having a predetermined inclination angle with respect to the first side of the window substrate at the boundary line.

* * * * *